United States Patent [19]

Jackson

[11] 3,852,201

[45] Dec. 3, 1974

[54] CLAY FREE AQUEOUS DRILLING FLUID

[76] Inventor: Jack M. Jackson, P.O. Box 35221, Houston, Tex. 77035

[22] Filed: Mar. 21, 1973

[21] Appl. No.: 343,228

Related U.S. Application Data

[63] Continuation-in-part of Ser. No. 101,177, Dec. 23, 1970, abandoned.

[52] U.S. Cl......... 252/8.5 A, 252/8.5 C, 252/8.5 P, 252/8.5 B, 175/66
[51] Int. Cl.... C10m 3/04, C10m 3/02, C10m 3/22, C10m 1/28
[58] Field of Search .......... 252/8.5 A, 8.5 C, 8.5 P, 252/8.5 B; 175/66

[56] References Cited
UNITED STATES PATENTS

| | | | |
|---|---|---|---|
| 2,570,947 | 10/1951 | Himil et al. | 252/8.5 |
| 2,727,001 | 12/1955 | Rowe | 252/8.5 |
| 2,800,449 | 7/1957 | Browning | 252/8.5 |
| 2,967,150 | 1/1961 | Prokop et al. | 252/8.5 |
| 3,017,351 | 1/1962 | Scott et al. | 252/8.5 |
| 3,046,221 | 7/1962 | Dodd | 252/8.5 |
| 3,108,068 | 10/1963 | Weiss et al. | 252/8.5 |
| 3,220,947 | 11/1965 | Sawyer | 252/8.5 |
| 3,319,715 | 5/1967 | Parks | 252/8.5 |
| 3,625,889 | 12/1971 | Branscum | 252/8.5 |

*Primary Examiner*—Benjamin R. Padgett
*Assistant Examiner*—B. Hunt
*Attorney, Agent, or Firm*—Kenneth H. Johnson

[57] ABSTRACT

The basic fluid is water or an oil-water mixture. The primary weighting materials are dissolved salts, e.g., sodium chloride, calcium chloride or mixed brines, and in these the calcium or sodium ions inhibit hydration and swelling of drilled solids. When non-cationic fluids are used, an inhibitor is added to prevent such hydration and disintegration — an electrolyte or a cationic surfactant. Any viscosifier added is one having neither a structured viscosity nor gel strength, hydroxyethyl cellulose for example. When the drilling fluid is pumped to the surface, most of the drilled solids are in their original condition and size, and are readily removed and discarded by screening and other available physical means. There is none of the build-up of solids associated with older systems, and hence no need for discarding, thinning, and make-up.

8 Claims, No Drawings

CLAY FREE AQUEOUS DRILLING FLUID

This application is a continuation-in-part of copending application Ser. No. 101,177, now abandoned, filed Dec. 23, 1970.

BACKGROUND OF THE INVENTION

The present invention lies in the field of drilling fluids or muds used in forming wellbores in the earth for the production of oil, gas, water and other minerals. More specifically, the invention applies to a method of formulating such a drilling fluid so that it can be continuously circulated down through the hollow drill string to pick up the cuttings formed by the drill bit, carry them to the surface in the annulus surrounding the bit, and pass them through a series of mechanical devices and settling tanks to remove the drilled solids and return the drilling fluid to the drill string for recirculation —with essentially no loss of either vehicle or additives. Even more specifically, the invention discloses drilling muds eliminating or substantially reducing many of the adjustment steps necessary with prior art muds, discarding a portion of an overladen mud, diluting the retained fraction, and making up to original composition by adding various constituents.

In the prior art of formulating drilling fluids, whether the fluid is to be circulated as in rotary drilling or placed in the bottom of the bore hole as in cable tool drilling, a clay such as bentonite is usually added to water to prepare an aqueous mud. In other cases drilled shales are allowed to accumulate in the mud as drilling progresses in order to build up such properties as weight, viscosity and gel strength. Sometimes muds with oil as the continuous phase are used to prevent hole problems, and in other cases blocculants are added to aqueous mud to aid in dropping out solids at the surface.

The result of using such a clay-based mud system has been a build-up of undesirable solids, either in the circulating mud or in the form of excess mud which is stored in reserve or disposal pits. This build-up, if not properly dealt with, will cause increases in unit weight (specific gravity), viscosity and gel strength to such high levels that a number of undesirable events may occur.

The mud cake on the wellbore wall may become so thick that swabbing occurs in pulling the bit, causing sloughing or caving of the wall and further increases in viscosity and gel strength. Gas bubbles from a drilled formation may become trapped in the mud. Drilling rate may decrease because of the thick filter cake on bottom. The fluid may even become so thick as to be unpumpable.

To avoid such dire results, mud engineers keep a close watch on the circulating mud and take many preventive steps, all rather expensive. Flocculants are added in the settling pits in attempts to bring about agglomeration and settling of the hydrated and dispersed drilled solids, a step likely to remove some of the originally added bentonite as well. A fraction of the mud is discarded or laid aside, and the balance is thinned to the desired unit weight with water. Of course, in so thinning the concentrations of some if not all constituents of the mud will be reduced below the desired levels. The only recourse available to the mud engineer is to add more of the very materials he has just thrown out in the discarded fraction, primarily bentonite but also many of the other additives he may be using for fluid loss control and various other properties.

SUMMARY OF THE INVENTION

Briefly stated the present invention relates to a clay-free aqueous drilling fluid consisting essentially of (1) water, (2) an electrolyte inhibitor for preventing hydration and swelling of drilled solids, selected from the group consisting of at least 600 ppm calcium ion, at least 200 ppm aluminum ion or chronium ion, at least 1,500 ppm potassium chloride, at least 5,000 ppm sodium chloride and combinations thereof, (3) a viscosifying amount of hydroxyethyl cellulose, and (4) from about 25 percent by weight of magnesia based on the combined weight of hydroxyethyl cellulose and magnesia, said drilling fluid being further characterized as not having thixotropic properties or structured type viscosity and not tending to form a filter cake.

As noted below in the examples hydroxyethyl cellulose (HEC) can be used by itself, but it is more readily and completely utilized when added with the activator used in the "Bex" viscosifier of Chemical Additives Company, e.g., finely divided magnesia. For complete details reference is made to the disclosure of copending application Ser. No. 101,123, of the same inventor filed Dec. 23, 1970, which is now abandoned and which is hereby incorporated by reference.

It has been found that various commercially available additives can be stabilized with a material acting in the nature of a catalyst. One such combination is hydroxyethyl cellulose, a well known viscosifier in brine muds, to which the present inventor adds magnesia to reduce the yield time from the prior art 15 minutes to about 2 to 3 minutes and which stabilizes the viscosity-increasing effect of the HEC at temperatures as high as 275°F over an indefinite length of time. Magnesia is a highly infusible magnesium oxide (MgO), prepared by the calcination of magnesium carbonate ($MgCO_3$) and is only slightly soluble in water, e.g., 0.0086 grams/100 cc (86 ppm) of water at 30°C., and is essentially non-hydratable. The same stabilizer, magnesia, has also been added to a calcium lignosulfonate intended primarily as a fluid loss additive to contribute further to the pore-plugging ability of the lignosulfonate. These two magnesia-stabilized additives, HEC and calcium lignosulfonate, have been used successfully in experimental drilling fluids in field drilling operations with considerable success. In such drilling, the two magnesia stabilized additives were the only additives to a basic calcium chloride brine other than some inert particles used in bridging pores, specifically a calcium carbonate.

Through a considerable number of experiments and tests it has been found that the pH of the drilling fluid after combining it with the additives of the present invention should be controlled to lie between about 8.5 and about 11.0. The minimum quantity of additive is close to that indicated in the examples below, and there is no particular problem about any maximum other than the ultimate of wasting material in the sense that it has no further effect. This is particularly true with regard to magnesia. Large excesses of magnesia do not interfer with the stabilizing effect and as a result amounts of magnesia several hundred times the minimums recited herein can be added to HEC viscosified drilling fluid without ill effect to the stabilizing effect, the viscosifier or drilling fluid.

One theory for the effectiveness of the magnesia in stabilizing HEC is that the very slightly soluble magnesia, which is present in excess of its solubility in the well bore fluid provides a reservoir of basicity of just the correct amount to maintain the pH of the fluid in the range at which the hydroxyalkyl cellulose is most stable. This theory is proposed as a possible mechanism and is not intended as a limitation of the invention.

It is the primary object of the present invention to reduce for the operator the cost of the drilling fluid he circulates in his well, and to do this by constantly recirculating the same fluid, discarding virtually nothing but the drilled solids. (Mud must be added with increasing depth, of course, and various changes in the composition of the mud must be made for changes encountered in the formations being drilled, e.g., permeability and formation fluids, but these must be made in any event.)

A second object is to furnish such a drilling fluid having neither gel strength nor structured viscosity, so that drilled solids are readily separable from the drilling fluid at the surface by one or both screening and settling from quiescent drilling fluid.

A third object is to furnish such a drilling fluid which is inhibited against hydration and disintegration of formation solids, either because an oil is used as part of the mud or because an inhibitor is added to a water phase.

A fourth object is to furnish a drilling fluid which enables the driller to obtain higher drilling rates than with clay muds.

A fifth object is to supply a drilling fluid having no tendency to build a thick filter cake on the borewall. Expressed positively, this object is to furnish a drilling fluid which forms a coating, rather than a cake, on the borewall.

A sixth object is to provide a drilling fluid having a filtrate inhibited against hydration and swelling of drilled clays, to avoid hole trouble which may be caused by sloughing clays or heaving shales.

A seventh object is a drilling fluid which reduces the restartup load on mud pumps after a period of time in which a quiescent column of drilling fluid has been sitting in a wellbore.

An eighth object is a drilling fluid which will permit ready escape of any gas intruding into the fluid during its passage through the wellbore.

The above and other objects are accomplished according to the present invention by the use of a closed circuit mud system wherein the base fluid is an inhibited brine which can be reused indefinitely by disposing of the drilled solids in essentially a dry state. In order to effectively maintain a closed circuit mud system several conditions must be satisfied, and these may be summarized as follows:

1. The mud must be conditioned so that the drilled solids do not hydrate and then swell or disintegrate into the mud system. Conditioning may be accomplished in various ways such as adding electrolytes to water. The addition of cationic surfactants to water is also effective as they will be substantive to the cuttings and coat them with a water repelling layer of chemical. Emulsions of water in oil are also effective as the cuttings will not hydrate in oil.

2. The mud must have neither thixotropic properties nor a structured type viscosity, as separation of the cuttings at the surface would be greatly hindered. Thixotrophy is also termed gel strength, and is a reversible gel wherein structure builds up when the mud is quiescent and then breaks down when the gelled fluid is agitated. A structured type viscosity is one wherein viscosity is primarily obtained by physical rather than physico-chemical means. Asbestos and attapulgite are examples of these type materials, each being structured as needles or filaments lacking the chemically active surface groups that characterize for example, filaments of hydroxyethyl cellulose (HEC). Their viscosities are characterized by high flat gel strengths, i.e., there is little change in viscosity when agitated and initial gel strength is high and constant over a period of time.

3. The mud must supply the properties needed for drilling. Some of these properties are carrying capacity, so that cuttings can be removed from the borehold, fluid loss control so that the borehole itself will be stabilized while drilling, and sufficient density to keep formation fluids out of the well during drilling.

As an example of a mud satisfying these conditions, a trouble-free wall was recently drilled in England using one of the low-cost mud systems of the present invention. This was Walton No. 1 Well, in Yorkshire, where Home Oil Company Ltd. of Calgary, Alberta, Canada was the operator. This mud system was prepared with calcium chloride brine as the base fluid. The cuttings-carrying ability of this brine was increased by adding the "Bex" viscosifier of Chemical Additives Company at the rate of 1½ pounds per barrel of mud, this material having as its active ingredient hydroxyethyl cellulose (HEC) in the ratio of about 50–75 percent by weight.

SPECIFIC EMBODIMENTS

In one of the experimental uses referred to above, the basic fluid was a sodium chloride brine having a unit weight of 9.2 pounds per gallon. To use the fluid as a means for opening hole and gravel packing in the producing zone to increase production, a magnesia stabilized HEC was added to the brine in the ratio of 1½ pounds of the additive per barrel of brine, the additive being that commercially available under the "Bex" trademark of Brinadd Company, in which the MgO makes up 25 percent of the additive.

To control fluid loss, a calcium lignosulfonate was added at the rate of about 5 pounds per barrel. This was in the form of "Brigeheal" fluid loss additive, again a product of Chemical Additives Company. It contains some finely divided magnesia and some inert calcium carbonate particles, and is not reactive with those constituents of the present invention which limit the viscosity of the mud to a no gel strength and no structured viscosity system, and inhibit the drilling fluid against hydration and swelling of drilled solids. It may be replaced by other fluid loss additives, when any such additive is necessary, which are non-reactive and do not so affect viscosity and hydration. Both additive packages, "Bex" and "Bridgeheal" have been employed separately with the improvements noted herein according to the present invention.

The major portion of the cuttings from this well were removed by shaker screens. All cuttings and drilled solids were hauled away from the well site in an essentially dry state, i.e., they had not hydrated. Only a small portion of the drilled cuttings from this operation became entrained in the mud, and said entrainment was attributed to some unavoidable abrasion by the pump and bit. A desander and centrifuge were used to remove most of these entrained solids, and the balance, along with the concomitant calcium chloride, were allowed to rest in a settling pit. The solids settled out and the supernatant clear calcium chloride brine was pumped back into the circulating mud system. A typical set of mud properties, as freshly mixed, was as follows:

| | |
|---|---|
| Weight | 10.8 pounds per gallon |
| Viscosity | 36 seconds by Marsh Funnel Viscosimeter |
| | 6 cp plastic viscosity |
| | 3 cp yield point |
| Gel strength | zero or 0/0 gels |

To have properties of inhibition, a base fluid should be
  a. Primarily oil, as in a water in oil emulsion, or
  b. Aqueous with one of the following:
    600 parts per million (ppm) calcium or other divalent cation
    200 ppm aluminum or other trivalent cation, e.g., chromium
    1500 ppm potassium chloride
    5000 ppm sodium chloride
    200 ppm of a cationic surfactant such as coco amine or a quatenary ammonium compound.

Various combinations of these salts and cations may also be used with good results.

The above example is intended to be only illustrative, of course. Viscosity without structure or thixotropy may be obtained easily through the use of various gums or polymers known to furnish aqueous fluids the property of pseudoplasticity, or through the use of emulsions of either water-in-oil or oil-in-water or through the use of solutions such as sugar in water. It will be apparent, of course, that the calcium brine may be an aqueous solution of any of a number of other cationic salts and mixtures of such salts; sodium chloride may be used when a lower unit weight is acceptable, and zinc chloride may be used to make the brine when a very heavy mud is required. The salt not only furnishes the weighting material (which does not tend to precipitate when the mud is quiescent), but also typically furnishes the cations for inhibiting the mud against hydration of solid material.

EXAMPLES

General — In each of the following examples set forth in the following tables, the same procedure was used. The starting material was a 350 milliliter (ml) specimen, whether water or brine or other solution. All of the other materials indicated were dry at the outset, and the indicated quantities were blended together while still dry. The dry materials were then added to the basic fluid and stirred for five minutes, after which the specimen container was capped and allowed to sit overnight at room temperature. On the following morning, the first set of viscosity measurements were made, together with a pH measurement. After such measurements, the specimen was hotrolled for 67 hours at 175° F, following which a second set of viscosity determinations were made, together with pH measurements and the 30 minute fluid loss test of the American Petroleum Institute (API).

Viscosity determinations were also made according to API standards, using a direct indicating viscometer, specifically a Fann V-G meter. The pH of the specimen was determined with a Beckman glass electrode pH meter.

All quantities of additives listed below are in grams (g). Abbreviations used are AV for apparent viscosity, PV for plastic viscosity, YP for yield point, FL for fluid loss, g for grams, ml for milliliters, cp for centipoise, SSW for a brine saturated with sodium chloride, 9.1. salt for a sodium chloride solution weighing 9.1 pounds per gallon of solution, CaLig for Calcium lignosulfonate, MgO for magnesia, HEC for hydroxyethyl cellulose, NC for no control (at least 300 ml lost in API fluid loss test). The calcium lignosulfonate is that made by St. Regis Pulp & Paper Co. and marketed by it as "Toranil B."

Table

| HEC Viscosifier, MgO or Ca(OH)$_2$ Stabilizers | | | | |
|---|---|---|---|---|
| | Col. 1 | Col. 2 | Col. 3 | Col. 4 |
| 9.1 salt, ml | 350 | 350 | 350 | 350 |
| HEC,g | 1.0 | 1.0 | 1.0 | 1.0 |
| MgO,g | | 0.5 | | 0.5 |
| CaLig,g | | | 5.0 | 5.0 |
| Properties after static aging 18 hours at room temperature | | | | |
| AV,cp | 14½ | 15 | 2½ | 16¾ |
| PV,cp | 9½ | 10½ | 2 | 11½ |
| YP,lb/100 ft$^2$ | 10 | 9 | 1 | 10½ |
| pH | 8.3 | 11.2 | 7.8 | 10.8 |
| Properties after dynamic aging 67 hours at 175°F | | | | |
| AV,cp | 12 | 13½ | 4¼ | 15¼ |
| PV,cp | 9 | 9½ | 4½ | 10½ |
| YP,lb/100 ft$^2$ | 6 | 8 | ½ | 9½ |
| pH | 8.4 | 11.1 | 5.5 | 10.0 |
| 30-minute API filtrate. | NC | 13.0 | NC | 91 |

Results such as those in the first two columns of the Table show that the same stabilizers will affect viscosifiers to decrease fluid loss (and improve viscosity) even when no lignosulfonate additive is present, while Columns 3–4 of the same table show that such MgO stabilizer both decrease fluid loss and increase viscosity when both of the basic additives are employed. In these examples the magnesia was 33⅓ percent of the combined weight of hydroxyethyl cellulose and magnesia.

The invention claimed is:

1. A clay-free aqueous drilling fluid consisting essentially of water, an electrolyte inhibitor for preventing hydration and swelling of drilled solids selected from the group consisting of at least 600 ppm calcium ion, at least 200 ppm aluminum ion or chromium ion, at least 1,500 ppm potassium chloride, at least 5,000 ppm sodium chloride and combinations thereof, a viscosifying amount of hydroxyethyl cellulose, and from about 25 percent by weight of magnesia based on the combined weight of hydroxyethyl cellulose and magnesia, said drilling fluid being further characterized as not having thixotropic properties or structured type viscosity and not tending to form a filter cake.

2. The aqueous drilling fluid according to claim 1 wherein said drilling fluid is a brine.

3. The aqueous drilling fluid according to claim 2 wherein said electrolyte is sodium chloride, potassium chloride or a mixture thereof.

4. The aqueous drilling fluid according to claim 1 containing a lignosulfonate salt fluid loss reducing additive.

5. The aqueous drilling fluid according to claim 4 wherein said drilling fluid is a brine.

6. The aqueous drilling fluid according to claim 4 wherein said lignosulonate salt is calcium lignosulfonate.

7. The aqueous drilling fluid according to claim 1 wherein said magnesia is present from about 25 percent to about 33⅓ percent by weight.

8. The aqueous drilling fluid according to claim 6 wherein said drilling fluid is a brine.

* * * * *